Patented June 16, 1925.

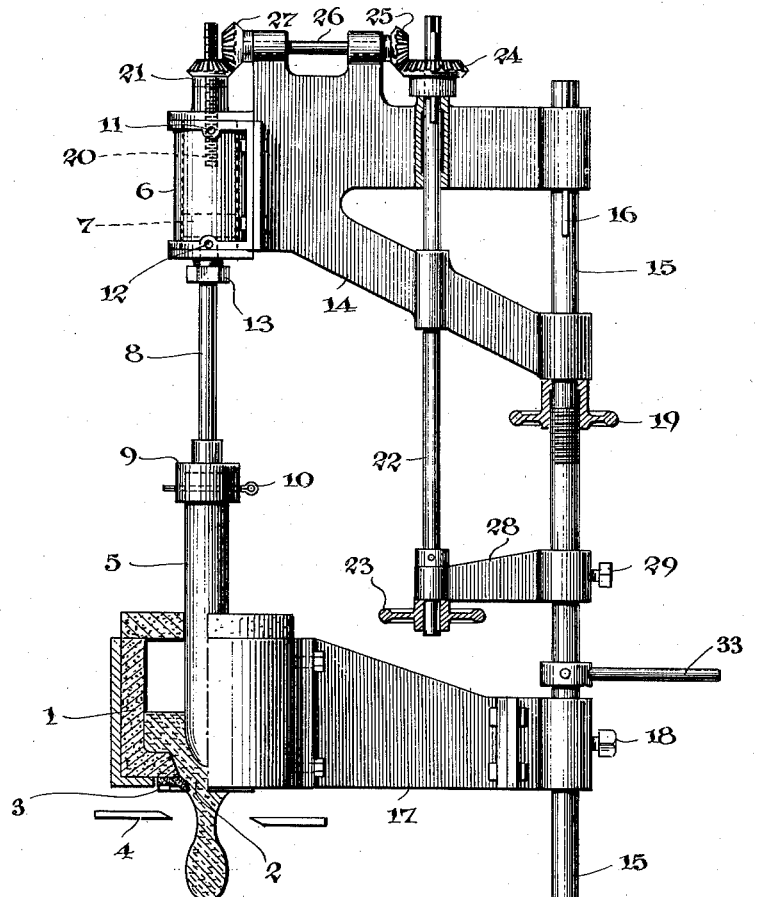

1,542,013

UNITED STATES PATENT OFFICE.

THOMAS STENHOUSE, OF WASHINGTON, PENNSYLVANIA, ASSIGNOR TO HAZEL-ATLAS GLASS CO., OF WHEELING, WEST VIRGINIA, A CORPORATION OF WEST VIRGINIA.

PLUNGER-OPERATING MECHANISM FOR GLASS FURNACES.

Application filed March 22, 1922. Serial No. 545,762.

*To all whom it may concern:*

Be it known that I, THOMAS STENHOUSE, a citizen of the United States, residing at Washington, in the county of Washington and State of Pennsylvania, have invented certain new and useful Improvements in Plunger-Operating Mechanisms for Glass Furnaces, of which the following is a full, clear, and exact description.

My invention relates to plunger operating mechanisms for glass furnaces, and one of the objects of my invention is to greatly simplify the plunger operating means by the employment of fluid pressure for operating the plungers.

Another object of my invention is to eliminate the necessity for the costly and complex systems of gears, cams, etc., heretofore employed for operating the plungers.

A further advantage of my invention resides in the provision of various adjustments to be used in conjunction with the fluid pressure opeating means, whereby the operator is given perfect control of the movements of the plunger.

Still another object of my invention is to provide means whereby the plunger may be withdrawn entirely clear of the flow spout, whenever it is necessary, because of breakage, to substitute a new plunger, or if it is desired to substitute a plunger of different capacity.

A further advantage of the invention resides in the provision of means whereby the plunger may be swung to a readily accessible position after it has been lifted vertically clear of the flow spout.

Other and further objects and advantages of my invention will be obvious to those skilled in the art, from the following description, when taken in connection with the accompanying drawings; in which, The figure is an end elevation of the entire mechanism; parts being broken away to more clearly show the construction.

Referring to the drawings more in detail, numeral 1 indicates a conventional flow spout connected in the usual manner with a glass furnace. The flow spout is provided with a flow hole or orifice 2, in which is mounted a removable bushing 3, and shears 4 are positioned below the orifice for the purpose of shearing the glass drops. The bushing is made removable to permit a new bushing to be substituted in case of breakage, and to permit bushings of various sizes to be inserted in accordance with the capacity desired. A plunger 5 of high heat resistance material, is mounted to reciprocate vertically in the flow spout in alignment with the flow hole.

The structure thus far described is old and well known in the art, and a very general description of the operation thereof will suffice. As the plunger descends the molten glass flows through the flow hole, in the manner indicated in the figure, and at the proper moment the stream is sheared, permitting the sheared portion, or glass drop, to fall into the mold. When the plunger is lifted the sheared portion of glass adhering to the plunger is drawn back into the body of glass where it is reheated.

Prior to my invention the practice has been to operate the plunger by means of a very costly and complex system of gears, cams, etc., and one of the objects of my invention is to eliminate these costly systems by the substitution of fluid pressure operated means.

The operating means which I have devised is of the utmost simplicity, and includes a fluid pressure cylinder 6 having a piston 7 operable therein. The piston 7 carries a downwardly extending piston rod 8, to the lower end of which is secured a socket member 9. The socket member is adapted to receive the upper end of the plunger 5, the plunger being removably attached thereto by means of a cotter pin 10. It will be understood, of course, that the invention is in no way limited to the specific means by which the plunger is attached to the piston rod, and I may substitute any other desirable means for operatively connecting the plunger and piston, either directly or indirectly; but the means which I have illustrated herein have been found in actual practice to produce most excellent results.

Fluid pressure inlet and exhaust ports are provided in the upper and lower portions of the cylinder, the ports being indicated by numerals 11 and 12 respectively. A stuffing box of any conventional type is located at the base of cylinder 6, being indicated by numeral 13.

Compressed air or other fluid pressure is applied alternately above and below the piston 7, the pressure being supplied to the cylinder in timed relation. As the manner of supplying the pressure constitutes no part of the present invention it is not deemed necessary to illustrate such a mechanism. As the pressure is applied alternately the piston 7 is caused to reciprocate, and through its connection with the plunger 5 the latter is also caused to reciprocate in the flow spout in vertical alignment with the flow hole. It is thus obvious that I have devised an extremely simple mechanism for operating the plunger, and that by the use of the present invention the very complex plunger operating systems consisting of gears, cams, reduction gearing, etc., heretofore employed, may be eliminated.

It is well known in the glass art that the quality of the products depends to some extent on the shape that the glass drops assume as they flow from the spout prior to being sheared. The consistency of the molten glass is, of course, one of the factors determining the shape of the glass drops. But there are various other factors which affect the shape of the drops, such as the length of the stroke of the plunger, the distance between the plunger and the flow hole when the former is at the end of its down stroke, etc. It is therefore highly desirable that the plunger operating mechanism be provided with various adjustments, whereby the operator may be able to govern the movements of the plunger to cause the glass drops to assume the desired shape.

I will now describe the simple adjustments which I have provided, and by which the operator is given perfect control of the plunger.

The cylinder 6 is suitably mounted on a bracket 14, which is slidably mounted on a standard 15, and is secured against relative rotation by means of a key 16. The standard has a bearing in the bracket 17, which is shown as rigidly attached to the casting supporting the flow spout 1; the standard being secured against rotation by means of a set screw 18. The standard is screw-threaded for a portion of its length, and mounted thereon is a handwheel 19 on which the bracket rests. By rotation of the handwheel the bracket 14 and cylinder 6 are either raised or lowered as desired, and obviously by raising or lowering the cylinder the position of the plunger is accordingly varied. For example, if it is desired to bring the plunger closer to the flow hole when at the lower limit of its stroke, it is only necessary to lower the cylinder 6 the desired distance by rotation of the handwheel 19.

For the purpose of controlling or adjusting the upward stroke of the plunger I provide a screw rod 20, which is screw-threadedly engaged in the upper cylinder head, and which has a bevel gear 21 slidably keyed thereon. By rotation of the bevel gear 21 the screw rod 20 is raised or lowered as desired, and hence the upper limit of the plunger stroke is adjusted. For the purpose of rotating the gear 21, a shaft 22 is rotatably mounted in the bracket 14, and is provided with a handwheel 23 adjacent its lower end, for the purpose of operating the shaft. Slidably keyed to the shaft 22, adjacent the upper end thereof, is a bevel gear 24. The bevel gear 24 meshes with bevel gear 25 carried on one end of the shaft 26, there being another bevel gear 27 carried on the opposite end of the shaft 26 and meshing with bevel gear 21. A bracket 28 provides a bearing for the shaft 24, the bracket being shown as carried by the standard and secured thereto by a set screw 29.

In the apparatus thus far described it is apparent that I have provided very simple adjustments in conjunction with the fluid pressure operated plunger, by which the operator is given perfect control over the movements thereof. By the operation of the handwheel 19 the cylinder and plunger may be raised or lowered as desired, thereby altering the distance between the plunger and the flow hole, at both the upper and lower limits of the plunger stroke. It is to be noted that while the position of the plunger relative to the flow hole has been changed, yet the length of stroke of the plunger remains unchanged. When it is desired to change the length of the plunger stroke, it is only necessary to change the position of the screw rod 20, which is accomplished by the operation of the handwheel 23. Obviously various combinations are possible as a result of the adjustments provided. For instance, by the operation of the handwheel 23 alone, the length of stroke is varied, and the upper limit of the stroke is varied, but the lower limit of the stroke remains unchanged; by the adjustment of the handwheel 19 alone, the upper and lower limits of the plunger are varied, but the length of the stroke remains unchanged; by the proper operation of both handwheels the upper and lower limits of the stroke, and the length of the stroke, may be changed, etc.

It will be understood, of course, that the frequency of the plunger stroke may be varied by the adjustment of the timing mechanism in any well known manner.

At times it becomes necessary to substitute another plunger, either because of breakage, or because a plunger of different capacity is desired. In the prior practice considerable time has been required to perform the operation of substituting another plunger, and the operators were exposed to excessive heat during the operation. Obviously it is highly desirable that some means should be provided whereby the plunger could be instantly withdrawn from the flow spout, and then be swung to a position where the operators would not be exposed to such excessive heat.

The mechanism which I have provided for accomplishing the above noted results is very simple. The standard 15 carries a piston 30 on its lower end, which is mounted in a cylinder 31; the cylinder being provided with a fluid pressure inlet and exhaust port 32 adjacent its lower end. To lift the plunger clear of the flow spout it is only necessary to loosen the set screw 18, and to admit pressure to the cylinder below the piston 30, thereby instantly lifting the standard and the entire mechanism carried thereby. If a cap is employed over the flow spout and surrounding the plunger, it will not be necessary to remove the cap, as is the case in the present practice, for the plunger will be lifted clear of the cap.

After the plunger has been lifted clear of the flow spout, in the manner described, the standard may be rotated by means of the operating handle 33, which I have shown as detachably and adjustably connected to the standard. By rotating the standard the entire operating mechanism and the plunger are swung away from the flow spout and to a position where the plunger is easily accessible to the operator, thereby facilitating the operation of substituting another plunger, and permitting the operation to be performed without causing the operators to expose themselves to excessive heat. To substitute a new plunger, in the construction illustrated, it is only necessary to withdraw the cotter pin, thereby releasing the plunger. Another plunger is them inserted in the socket member 9, and the cotter pin is replaced, thereby securing the plunger to the piston. Of course any other desired means may be employed for attaching the plunger to the piston. After the substitution has been made, the standard is rotated to swing the plunger back to its position in alignment with the flow hole, and the pressure is released from the cylinder 31, thereby lowering the plunger to its operative position in the flow spout. The set screw 18 is now operated to lock the standard against rotation, and the mechanism is ready to continue the reciprocatory action of the plunger.

The construction and operation of the mechanism will be clearly understood from the foregoing description, and the many advantageous results thereof will be apparent.

Among the more important advantages the following may be mentioned.

By the use of a fluid pressure cylinder for operating the plunger, the operating mechanism is greatly simplified, and the use of the very complex and costly systems of gears, cams, reduction gearing, etc., heretofore employed, is eliminated.

By the use of the various adjustments in conjunction with the fluid pressure operating means, the operator is given perfect control of the movements of the plunger, and by the proper manipulation of these adjustments he is able to cause the glass drops to assume the desired shape and size.

The operation of replacing the plunger is greatly facilitated by the provision of means whereby the plunger may be instantly withdrawn from the flow spout; and by so constructing the mechanism that the plunger may be swung to an accessible position after being withdrawn; thereby enabling the operator to perform the operation in less time and under much more favorable working conditions.

In accordance with the patent statutes I have described the particular embodiment of the invention shown herein, but I do not wish to be understood thereby as limiting myself or the scope of the invention, as many changes and modifications may be made without departing from the spirit of the invention, and all such I aim to include in the scope of the appended claims.

What I claim as new and desire to secure by Letters Patent is:

1. In a glass furnace, a reciprocable plunger; fluid pressure means in substantially vertical alignment with the plunger for reciprocating the latter, and means for adjusting the lower limit of the plunger stroke.

2. In a glass furnace, a reciprocable plunger, fluid pressure means in substantially vertical alignment with the plunger for reciprocating the latter, and means for adjusting the upper and lower limits of the plunger stroke.

3. In a glass furnace, a reciprocable plunger, fluid pressure means in substantially vertical alignment with the plunger for reciprocating the latter, and means for varying the limits of the plunger stroke without varying the length of the stroke.

4. In a glass furnace, a reciprocable plunger, a fluid pressure cylinder operatively connected with the plunger, and means for raising and lowering said cylinder.

5. A glass furnace including a flow spout, a plunger adapted to reciprocate in said flow spout, means for reciprocating the plunger, and fluid pressure operated means for lifting the plunger clear of the flow spout.

6. A glass furnace including a flow spout, a plunger adapted to reciprocate in said flow spout, fluid pressure operated means for reciprocating the plunger, and fluid pressure operated means for lifting the plunger clear of the flow spout.

7. A glass furnace including a flow spout, a plunger adapted to reciprocate in said flow spout, means for reciprocating the plunger, means for lifting the plunger clear of the flow spout, and means whereby the plunger may be swung laterally after clearing the flow spout.

8. A glass furnace including a flow spout, a plunger adapted to reciprocate in said flow spout, fluid pressure operated means for reciprocating the plunger, means for lifting the plunger entirely clear of the flow spout, and means whereby the plunger may be swung laterally after clearing the flow spout.

9. A glass furnace including a flow spout, a plunger adapted to reciprocate in said flow spout, fluid pressure operated means for reciprocating the plunger, means for adjusting the length of the plunger stroke, means for lifting the plunger entirely clear of the flow spout, and means for swinging the plunger laterally after it is clear of the flow spout.

10. A glass furnace including a flow spout, a plunger adapted to reciprocate in said flow spout, fluid pressure operated means for reciprocating the plunger, means for adjusting the limits of the plunger stroke, means for lifting the plunger entirely clear of the flow spout, and means for swinging the plunger laterally after it is clear of the flow spout.

11. In a glass furnace, a reciprocable plunger, a standard, a bracket carried by said standard, a fluid pressure cylinder carried by said bracket, an operative connection between the cylinder and plunger, and means for lifting the standard.

12. In a glass furnace, a reciprocable plunger, a standard, a bracket slidably mounted on said standard, means for adjusting said bracket vertically, a fluid pressure cylinder carried by said bracket, and an operative connection between the cylinder and the plunger.

13. In a glass furnace, a reciprocable plunger, a standard, a bracket carried by said standard, a fluid pressure cylinder carried by said bracket and operatively connected with the plunger, a screw rod for varying the upper limit of the plunger stroke, means carried by said bracket and connected with the screw rod whereby said rod may be vertically adjusted, and means for lifting the standard.

14. A glass furnace including a flow spout, a plunger adapted to reciprocate in said flow spout, a standard, a bracket carried by the standard, a fluid pressure cylinder carried by the bracket, an operative connection between the cylinder and the plunger, and means for bodily lifting the standard and the parts carried thereby.

15. A glass furnace including a flow spout, a plunger adapted to reciprocate in the flow spout, a standard, a bracket carried by the standard, a fluid pressure cylinder carried by the bracket, an operative connection between the cylinder and the plunger, and a second fluid pressure cylinder for bodily lifting the standard and the parts carried thereby.

16. A glass furnace including a flow spout, a plunger adapted to reciprocate in the flow spout, a standard, a bracket slidably mounted on the standard, a cylinder carried by the bracket, an operative connection between the cylinder and the plunger, means for vertically adjusting the bracket on the standard, and means for bodily lifting the standard and the parts carried thereby.

17. A glass furnace including a flow spout, a plunger adapted to reciprocate in the flow spout, a standard, a bracket slidably mounted on the standard, a cylinder carried by said bracket, an operative connection between the cylinder and the plunger, means for vertically adjusting the bracket, said means including an operating element screw-threadedly mounted on said standard and engaging said bracket, and means for bodily lifting said standard and the parts carried thereby.

18. A glass furnace including a flow spout, a plunger adapted to reciprocate in the flow spout, a standard, a fluid pressure cylinder carried by the standard and operative connection between the cylinder and the plunger, means for lifting the standard, and means for rotating the standard.

19. A glass furnace including a flow spout, a plunger adapted to reciprocate in the flow spout, a standard, a fluid pressure cylinder carried by the standard, and operatively connected with the plunger, means for vertically adjusting the cylinder, means for bodily lifting the standard and the parts carried thereby, and means for rotating the standard and the parts carried thereby.

THOMAS STENHOUSE.